(12) United States Patent
De Risi et al.

(10) Patent No.: US 10,723,928 B1
(45) Date of Patent: *Jul. 28, 2020

(54) HEAT TRANSFER MIXTURE

(71) Applicant: HT MATERIALS SCIENCE (IP) LIMITED, Dublin (IE)

(72) Inventors: Arturo De Risi, Lecce (IT); Francesco Micali, Lecce (IT); Marco Milanese, Arnesano (IT)

(73) Assignee: HT MATERIALS SCIENCE (IP) LIMITED, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 16/577,306

(22) Filed: Sep. 20, 2019

(51) Int. Cl.
  *C09K 5/00* (2006.01)
  *C09K 5/10* (2006.01)
  *C09K 5/14* (2006.01)
  *B82Y 30/00* (2011.01)

(52) U.S. Cl.
  CPC ............... *C09K 5/10* (2013.01); *C09K 5/14* (2013.01); *B82Y 30/00* (2013.01)

(58) Field of Classification Search
  None
  See application file for complete search history.

(56) References Cited

U.S. PATENT DOCUMENTS

| | | | | |
|---|---|---|---|---|
| 7,744,775 B2 * | 6/2010 | Yang | ................ | C09K 5/20 106/14.05 |
| 2008/0302998 A1 * | 12/2008 | Hong | ................ | C09K 5/10 252/74 |
| 2012/0006509 A1 * | 1/2012 | McCants | ................ | C09K 5/10 165/104.11 |

\* cited by examiner

*Primary Examiner* — Necholus Ogden, Jr.
(74) *Attorney, Agent, or Firm* — Sorell, Lenna & Schmidt, LLP

(57) ABSTRACT

A heat transfer mixture is represented by the formula: 1=Vpg/Vnf+Vw/Vnf+Vpw/Vnf+Vsf/Vnf+Vbs/Vnf+Vac/Vnf+Vci/Vnf. Vnf is a volume of a nanofluid. Vpg is a volume of propylene glycol. Vw is a volume of water. Vpw is a volume of a nanopowder. Vsf is a volume of a surfactant. Vbs is a volume of a base additive. Vac is a volume of an acid additive. Vci is a volume of a corrosive inhibitor.

45 Claims, 2 Drawing Sheets

HEAT TRANSFER MIXTURE

TECHNICAL FIELD

The present disclosure relates, in general, to refrigerants, and more particularly, to nanofluids that include aluminum oxide nanoparticles for use in thermal systems.

BACKGROUND

For well over a century, micro-sized particles with high thermal conductivity have been used to increase the thermal characteristics of working fluids. However, micro-sized particles can be abrasive and can precipitate out due to their higher density. More recently, nano-sized particles were introduced into a base liquid to constitute a nanofluid. In particular, copper, aluminum, or carbon based nanoparticles were used to create colloidal suspension fluids with enhanced thermal characteristics.

Conventional nanofluids have shown varying degrees of improvement in thermal performance with the addition of the nanoparticles to the thermal fluid. Many conventional nanofluids use copper (II) oxide (CuO) nanoparticles to form the nanofluid due to the favorable thermal properties of copper (II) oxide powders. However, nanofluids formed with copper (II) oxide suffer from several drawbacks that can impede their commercial use in a thermal system. For example, fluids containing copper (II) oxide nanoparticles have a tendency to mix with and retain air and oxygen within the fluid, which adversely affects the thermal properties of the fluid and can create problems in the thermal system. Additionally, the copper (II) oxide nanoparticles tend to agglomerate and/or stick to the container of the fluid in the thermal system, which can lead to impairment and fouling of the flow of fluid in the system. Furthermore, the blackish color of the nanofluids available on the market is less desirable than the lighter colored fluid of the present application.

As such, a need currently exists for a commercially viable nanofluid that has effective thermal properties, is relatively stable during use, and can be easily mass produced. This disclosure describes an improvement over these prior art technologies.

SUMMARY

In one embodiment, in accordance with the principles of the present disclosure, a heat transfer mixture is represented by the formula: 1=Vpg/Vnf+Vw/Vnf+Vpw/Vnf+Vsf/Vnf+Vbs/Vnf+Vac/Vnf+Vci/Vnf. Vnf is a volume of a nanofluid. Vpg is a volume of propylene glycol. Vw is a volume of water. Vpw is a volume of a nanopowder. Vsf is a volume of a surfactant. Vbs is a volume of a base additive. Vac is a volume of an acid additive. Vci is a volume of a corrosive inhibitor.

In one embodiment, in accordance with the principles of the present disclosure, a heat transfer mixture comprises or consists of propylene glycol, water, a nanopowder comprising $Al_2O_3$, a surfactant, a base additive, an acid additive and a corrosive inhibitor. The nanopowder has a particle size between about 100 nanometers and about 600 nanometers. The heat transfer mixture comprises between about 1% by volume and about 20% by volume of the nanopowder. The heat transfer mixture comprises between about 0.1% by volume and about 3% by volume of the surfactant. The heat transfer mixture has a pH is between about 8.5 to about 12.

In one embodiment, in accordance with the principles of the present disclosure, a heat transfer mixture comprises or consists of between about 30% by volume and up to about 70% by volume of propylene glycol, between about 30% by volume and about 70% by volume of water, between about 1.0% by volume and about 20% by volume of a nanopowder comprising $Al_2O_3$, between about 0.1% by volume and about 3% by volume of a surfactant, between about 1.0% by volume and about 10% by volume of a base additive, between about 1.0% by volume and about 10% by volume of an acid additive and between about 0.001% by volume and about 1.0% by volume of a corrosive inhibitor. The nanopowder has a particle size between about 100 nanometers and about 600 nanometers. The heat transfer mixture has a pH of about 10.0.

In one embodiment, in accordance with the principles of the present disclosure, a heat transfer mixture is represented by the formula: 1=Vpg/Vnf+Vw/Vnf+Vpw/Vnf+Vsf/Vnf+Vbs/Vnf. Vnf is a volume of a nanofluid. Vpg is a volume of propylene glycol. Vw is a volume of water. Vpw is a volume of a nanopowder. Vsf is a volume of a surfactant. Vbs is a volume of a base additive.

In one embodiment, in accordance with the principles of the present disclosure, a heat transfer mixture comprises or consists of propylene glycol, water, a nanopowder comprising $Al_2O_3$, a surfactant, and a base additive. The nanopowder has a particle size between about 100 nanometers and about 600 nanometers. The heat transfer mixture comprises between about 1% by volume and about 20% by volume of the nanopowder. The heat transfer mixture comprises between about 1% by volume and about 3% by volume of the surfactant. The heat transfer mixture has a pH greater than 8.5.

In one embodiment, in accordance with the principles of the present disclosure, a heat transfer mixture comprises or consists of between about 25% by volume and about 50% by volume of propylene glycol, between about 30% by volume and about 70% by volume of water, between about 1.0% by volume and about 20% by volume of a nanopowder comprising $Al_2O_3$, between about 0.1% by volume and about 3% by volume of a surfactant and between about 1.0% by volume and about 10% by volume of a base additive. The nanopowder has a particle size between about 100 nanometers and about 600 nanometers. The heat transfer mixture has a pH of about 10.0.

In one embodiment, in accordance with the principles of the present disclosure, a heat transfer mixture is represented by the formula: 1=Veg/Vnf+Vw/Vnf+Vpw/Vnf+Vsf/Vnf+Vbs/Vnf+Vac/Vnf+Vci/Vnf. Vnf is a volume of a nanofluid. Veg is a volume of ethylene glycol. Vw is a volume of water. Vpw is a volume of a nanopowder. Vsf is a volume of a surfactant. Vbs is a volume of a base additive. Vac is a volume of an acid additive. Vci is a volume of a corrosive inhibitor.

In one embodiment, in accordance with the principles of the present disclosure, a heat transfer mixture comprises or consists of ethylene glycol, water, a nanopowder comprising $Al_2O_3$, a surfactant, a base additive, an acid additive and a corrosive inhibitor. The nanopowder has a particle size between about 100 nanometers and about 600 nanometers. The heat transfer mixture comprises between about 10% by volume and about 20% by volume of the nanopowder. The heat transfer mixture comprises between about 0.1% by volume and about 3% by volume of the surfactant. The heat transfer mixture has a pH greater than 8.5.

In one embodiment, in accordance with the principles of the present disclosure, a heat transfer mixture comprises or consists of between about 25% by volume and about 50% by volume of ethylene glycol, between about 30% by volume and about 70% by volume of water, between about 1.0% by volume and about 20% by volume of a nanopowder comprising $Al_2O_3$, between about 0.1% by volume and about 3% by volume of a surfactant, between about 0% by volume and about 10% by volume of a base additive, between about 1% by volume and about 10% by volume of an acid additive and between about 0.001% by volume and about 1.0% by volume of a corrosive inhibitor. The nanopowder has a particle size between about 100 nanometers and about 600 nanometers. The heat transfer mixture has a pH of about 10.0.

In one embodiment, in accordance with the principles of the present disclosure, a heat transfer mixture is represented by the formula: 1=Veg/Vnf+Vw/Vnf+Vpw/Vnf+Vsf/Vnf+Vac/Vnf. Vnf is a volume of a nanofluid. Veg is a volume of ethylene glycol. Vw is a volume of water. Vpw is a volume of a nanopowder. Vsf is a volume of a surfactant. Vac is a volume of an acid additive.

In one embodiment, in accordance with the principles of the present disclosure, a heat transfer mixture comprises or consists of ethylene glycol, water, a nanopowder comprising $Al_2O_3$, a surfactant and an acid additive. The nanopowder has a particle size between about 100 nanometers and about 600 nanometers. The heat transfer mixture comprises between about 1% by volume and about 20% by volume of the nanopowder. The heat transfer mixture comprises between about 0.1% by volume and about 3% by volume of the surfactant. The heat transfer mixture has a pH between about 8.5 and about 12.0.

In one embodiment, in accordance with the principles of the present disclosure, a heat transfer mixture comprises or consists of between about 25% by volume and about 50% by volume of ethylene glycol, between about 30% by volume and about 70% by volume of water, between about 1.0% by volume and about 20% by volume of a nanopowder comprising $Al_2O_3$, between about 0.1% by volume and about 3% by volume of a surfactant and between about 0% by volume and up to about 10% by volume of an acid additive. The nanopowder has a particle size between about 100 nanometers and about 600 nanometers. The heat transfer mixture has a pH of about 10.0.

BRIEF DESCRIPTION OF THE DRAWINGS

The present disclosure will become more readily apparent from the specific description accompanied by the following drawings, in which.

Like reference numerals indicate similar parts throughout the figures.

DETAILED DESCRIPTION

Figure 1:
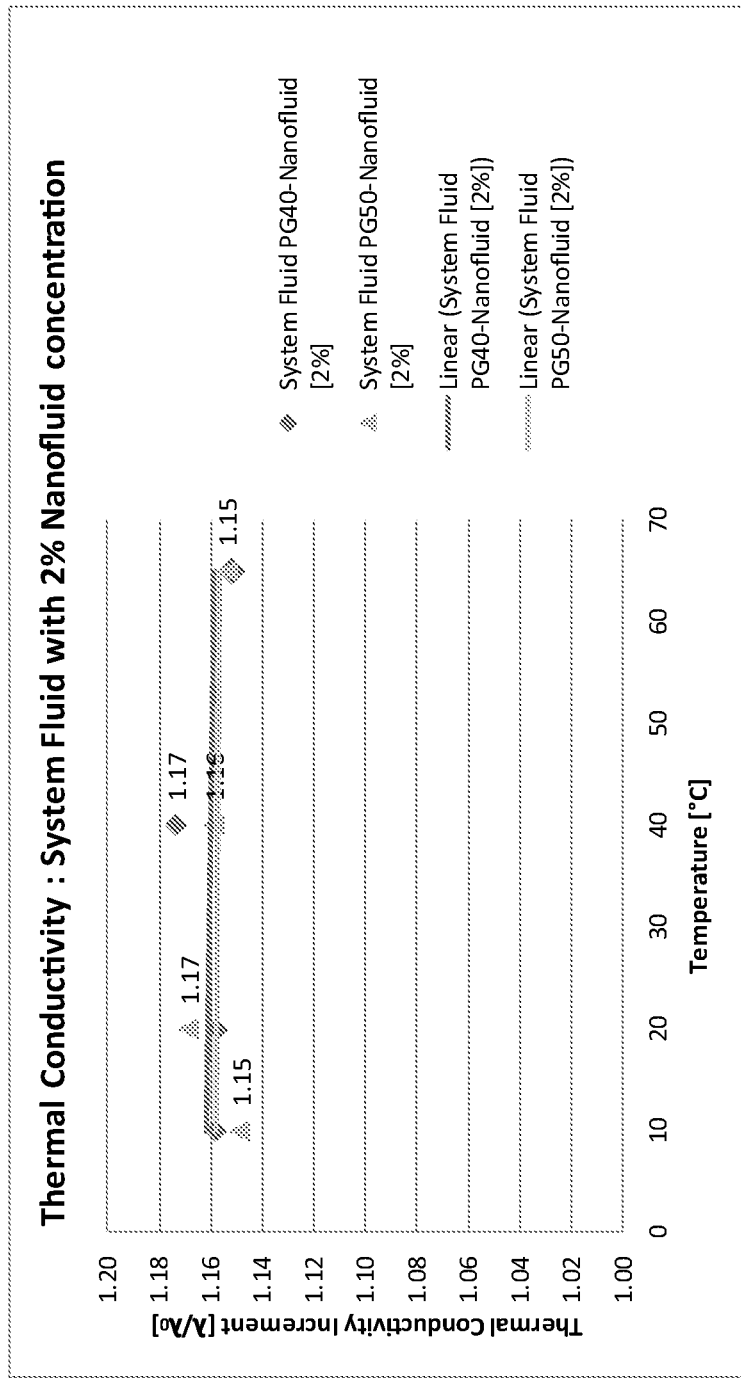
FIG. 1 is a graph showing performance characteristics of a heat transfer mixture in accordance with the principles of the present disclosure.

The present disclosure may be understood more readily by reference to the following detailed description of the disclosure taken in connection with the accompanying drawing figures, which form a part of this disclosure. It is to be understood that this disclosure is not limited to the specific devices, methods, conditions or parameters described and/or shown herein, and that the terminology used herein is for the purpose of describing particular embodiments by way of example only and is not intended to be limiting of the claimed disclosure. Also, as used in the specification and including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment. The ranges disclosed herein can include any of the upper limits of the ranges in combination with any of the lower limits of the ranges. It is also understood that all spatial references, such as, for example, horizontal, vertical, top, upper, lower, bottom, left and right, are for illustrative purposes only and can be varied within the scope of the disclosure. For example, the references "upper" and "lower" are relative and used only in the context to the other, and are not necessarily "superior" and "inferior".

The following discussion includes a description of a heat transfer mixture, in accordance with the principles of the present disclosure. Alternate embodiments are also disclosed. Reference will now be made in detail to the exemplary embodiments of the present disclosure.

The present disclosure relates to formulations, processes and applications for a nanofluid having nanoparticles of Aluminum Oxide with selected specifications in terms of size properties and morphology as well as the ability to be stably suspended inside a base fluid with a specific chemical composition. In some embodiments, a solid phase is dispersed in a liquid. The solid phase is made of clusters that have a dimension such to avoid phonon scattering that might occur at the liquid solid interphase. The heat transfer mixture of the present disclosure is formulated and processed, taking the above into account, to maximize the heat transfer capability of the nanofluid. In some embodiments, the heat transfer mixture of the present disclosure is a high concentration nanofluid with about 1% to about 20% in volume of nanoparticles which can be installed into a thermal system with a retrofit solution which feeds the existing heat transfer fluid into the thermal system.

A nanofluid is a heterogeneous suspension or mixture comprising two phases, a solid phase and a liquid phase, in which the dimensions of the solid phase components in suspension are nanometric. The two phases of the suspension are also separable through mechanical methods, since the substances used to form the heterogeneous mixture or suspension do not modify their structure, as is the case, for example, in the solutions.

The presence of Aluminum Oxide nanoparticles gives the nanofluid relevant thermal and fluid dynamic properties compared to the base fluid. For example, the thermal conductivity, heat capacity, viscosity, density and electrical conductivity.

In many nanofluids known as the state of the art, the nanoparticles of the solid phase have a tendency to deposit due to gravity. This is a phenomenon that has several consequences because it causes a reduction of the volumetric concentration of the nanoparticles inside the nanofluid therefore the thermal and fluid properties are different than expected. Furthermore, in an unstable nanofluid the particles tend to accumulate inside the pipes where the nanofluid is installed leading to clogging thus creating an obvious problem for certain applications.

Another phenomenon observed in the nanofluids known as the state of the art is the tendency of the nanopowders to generate clusters or agglomerations (solids composed by the combination of various nanometric particles) which have substantially larger dimensions of the individual particles. This phenomenon is negative, as it modifies the properties of the nanofluid, increases the tendency to settle and significantly increases the abrasion of the fluid which can lead to failures in certain components of the system.

The heat transfer mixture of the present disclosure is configured to provide a nanofluid having a greater heat exchange capacity because it has a high thermal conductivity, a higher density and thermal capacity and provides a stable nanofluid, in which the solid phase does not tend to separate from the liquid phase or deposit on the pipe surface inside the system.

In some embodiments, the heat transfer mixture of the present disclosure comprises water, propylene glycol and ethylene glycol as base fluid together with surfactant additives to allow the nanoparticles stable suspension.

The physical variables of the suspension as base knowledge for the stabilization process optimization are the pH of the suspension, the zeta potential of the suspension, the hydrophilic-hydrophobic balance (HLB), and the specific surface area (SSA) of the nanoparticles.

A particle dispersed in a liquid generally presents at the surface the electrostatic charges that generate an electric field responsible for the redistribution of the ions present around the surface of the nanoparticles. This leads to an increase in the concentration of ions with electrical charge opposite to those on the particle surface.

This electrical charge distribution causes a variable electrical potential with the distance from the particle, called zeta potential. When two particles are so close together that their double layers overlap, they repel each other with an electrostatic force whose intensity depends on the potential zeta, and at the same time attract each other for the well-known attraction of Van der Walls. If the zeta potential is too low, the repulsive force is not strong enough to overcome the Van der Walls attraction between the particles, and the particles will start to agglomerate making the suspension unstable. By adding a surfactant in a water-based suspension, a high zeta potential instead prevents agglomeration and maintains uniform dispersion. The surfactant molecules intervene on the separation surfaces between the liquid phase and the solid phase with the polar part facing the liquid phase and the polar part towards the solid phase.

In some embodiments, the Heat transfer mixture of the present disclosure is a biphasic mixture consisting of a liquid fraction and a solid fraction including: Aluminum Oxide nanoparticles, pure water, propylene glycol, ethylene glycol, a polar—nonionic surfactant, an anionic surfactant, a non-polar surfactant and sodium hydroxide.

In some embodiments, the heat transfer mixture of the present disclosure is a stable suspension with relevant concentration of nanoparticles up to about 20% in volume. It can be diluted up to 1:20 in order to obtain the system fluid desired. Despite the dilution, the nanofluid is stable and contains enough additive to prevent corrosion and to keep the suspension stable in the final system destination. In some embodiments, the heat transfer mixture of the present disclosure shows stability for at least 1680 hours. In particular, by adding a high concentration nanofluid in a base heat transfer fluid made of water, water and propylene glycol or ethylene glycol, the thermal conductivity increment is achieved. For example, the thermal conductivity increment of the base fluid made of water and propylene glycol at 60:40 volume concentration is obtained by adding the high concentration of stable nanofluid. In fact, with 2% nanofluid concentration in the system fluid and propylene glycol at 40% in volume, the thermal conductivity increment achieved is between 15% and 17%. FIG. 1 shows the thermal conductivity increment obtained by adding the nanofluid to the base fluid made of water and propylene glycol at 60:40 volume concentration.

In some embodiments, the heat transfer mixture of the present disclosure is an engineered suspension of nanometer-sized solid particles in a base fluid. Suspending small solid particles in the energy transmission fluids can improve their thermal conductivity and provides an effective and innovative way to significantly enhance their heat transfer characteristics by increasing convective heat transfer in closed loop hydronic systems, reducing energy demand. The heat transfer mixture of the present disclosure can be applied to various industrial and commercial HVAC systems and related components including chillers, heat exchangers, boilers and energy recovery units. Heat exchangers are sized for certain approach temperatures. The lower the approach operational temperature, the larger the heat exchanger. In fact, the specific surface of heat exchangers depends on the temperature difference between the two thermal fluids. The surface area S of heat exchangers that is needed for exchanging an amount Qtot of heat in time Δt depends also on the fluids involved and on the material properties of the exchanger surface that is subject to degradation over time. Because the heat transfer mixture of the present disclosure leads the system fluid to higher thermal conductivity and mass flow rate, it increases heat transfer between the air and the thermal fluid, thereby increasing heat exchanger performance.

Figure 2:
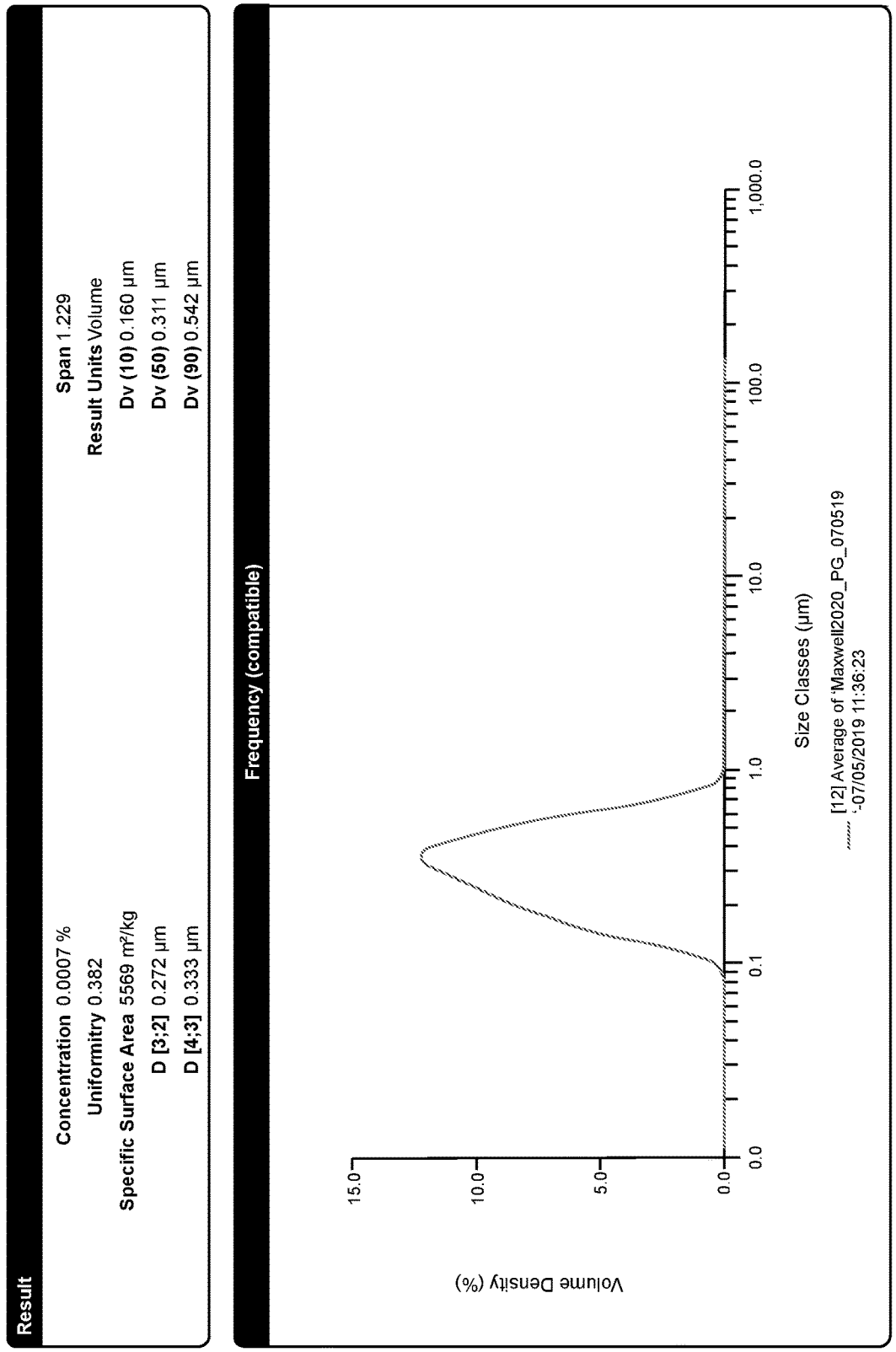
FIG. 2 is a graph showing performance characteristics of a heat transfer mixture in accordance with the principles of the present disclosure.

In some embodiments, the heat transfer mixture of the present disclosure comprises Aluminum Oxide ($Al_2O_3$) [10-20% in volume] and base fluid made of Water [15%-90%] plus propylene glycol or ethylene glycol [75%-0%]. The surfactant amount is in the range of 2.0%-4.0% in weight of the nanoparticle quantity. In volume it is between about 0.1% to about 3% of the nanofluid volume in the mixture. The size distribution curve of the clusters of nanoparticles is required to be at least 50% of the nanoparticle volume in the range of diameter 100 nm<D<600 nm. FIG. 2 shows the size distribution curve of the clusters of nanoparticles used in the heat transfer mixture of the present disclosure.

In some embodiments, the following condition in the formulation is used to keep the nanofluid stable by additional surfactant as a function of the amount of glycol, the nanoparticles concentration: $1=a_{pg}+b_w+c_{np}+d_{sf}+e_{bs}+f_{ac}+g_{ci}$. The parameter ranges are: $0.293<a_{pg}<0.488$; $0.354<b_w<0.683$; $0.01<c_{np}<0.2$; $0.0012<d_{sf}<0.0234$; $0.013<e_{bs}<0.068$; $0.013<f_{ac}<0.068$; and $0.0002<g_{ci}<0.001$. The ratios of the variables are as follows: $a_{pg}$=Vpg/Vnf; $b_w$=Vw/Vnf; $c_{np}$=Vpw/Vnf; $d_{sf}$=Vsf/Vnf; $e_{bs}$=Vbs/Vnf; $f_{ac}$=Vac/Vnf; and $g_{ci}$=Vci/Vnf. The variables are defined as follows: Vnf=Volume of nanofluid; Vpg=Volume of propylene glycol; Vw=Volume of water; Vpw=Volume of nanopowder; Vsf=Volume of surfactant; Vbs=Volume of base; and Vac=Volume of acid. In some embodiments, the heat transfer mixture comprises ethylene glycol in place of, or in addition to, propylene glycol. In some embodiments, the heat transfer mixture does not include a base and consists of propylene glycol or ethylene glycol, water, the nanopowder, the surfactant, the acid, and the corrosion inhibitor. In some embodiments, the heat transfer mixture does not include the base or the acid and consists of propylene glycol or ethylene glycol, water, the nanopowder, the surfactant and the corrosion inhibitor. In some embodiments, the heat transfer mixture does not include the acid and consists of propylene glycol or ethylene glycol, water, the nanopowder, the surfactant, the base, and the corrosion inhibitor.

In some embodiments, the heat transfer mixture of the present disclosure is made by adding a surfactant before a milling step and because it is a cold milling process, the surfactant is not affected by local high temperature due to the friction. A fluidizer is used instead of sonication. It is a mechanical process where the nanofluid is subject to an extremely high shear rate. During this process, the fluid achieves a speed up to 400 m/s and goes through a microchannel with diamond coating where the clusters are reduced to the desired size.

In some embodiments, the surfactant is a sodium salt solution of polyamino polyether methylene phosphonic acid [CAS:130668-24-5] and the concentration of the surfactant by volume in the nanofluid is about 1% to about 3% by volume. In some embodiments, the surfactant is an anionic surfactant, such as, for example, the anionic surfactant shown below.

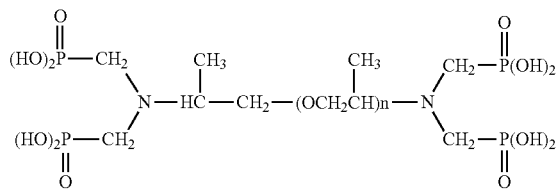

In some embodiments, the surfactant comprises non-ionic, anionic, cationic and amphoteric surfactants and blends thereof. Suitable nonionic surfactants include, but are not necessarily limited to, alkyl polyglycosides, sorbitan esters, methyl glucoside esters, amine ethoxylates, diamine ethoxylates, polyglycerol esters, alkyl ethoxylates, alcohols that have been polypropoxylated and/or polyethoxylated or both. Suitable anionic surfactants selected from the group consisting of alkali metal alkyl sulfates, alkyl ether sulfonates, alkyl sulfonates, alkyl aryl sulfonates, linear and branched alkyl ether sulfates and sulfonates, alcohol polypropoxylated sulfates, alcohol polyethoxylated sulfates, alcohol polypropoxylated polyethoxylated sulfates, alkyl disulfonates, alkylaryl disulfonates, alkyl disulfates, alkyl sulfosuccinates, alkyl ether sulfates, linear and branched ether sulfates, alkali metal carboxylates, fatty acid carboxylates, and phosphate esters. Suitable cationic surfactants include, but are not necessarily limited to, arginine methyl esters, alkanolamines and alkylene diamides. Suitable surfactants may also include surfactants containing a non-ionic spacer-arm central extension and an ionic or nonionic polar group. Other suitable surfactants are dimeric or gemini surfactants and cleavable surfactants.

In some embodiments, the amount of surfactant used is optimized as function of the nanoparticles' weight and size distribution. In some embodiments, the surfactant comprises high temperature resistant compounds (Tmax=220° C.) which provides a fundamental advantage in the process because it is possible to mix it before the grinding process without any degradation due to high temperature of the grinding media friction. Having the surfactant included during the mill process optimizes the process by enhancing the dispersant effect on nanopowder.

In some embodiments, the nanoparticles are clusters in a range between 100-600 nm. The solid phase is made of clusters that have a dimension such to avoid phonon scattering that might occur at the liquid solid interphase. This condition optimizes the heat transfer effects and the thermal waves propagation. In some embodiments, to achieve this size distribution of the clusters, a grinding media of 0.3 mm and a grinder with 4500 rpm is used for 3 hours.

In some embodiments, the heat transfer mixture of the present disclosure is made using a fluidizer instead of sonication. It is a mechanical process where the nanofluid is subject to an extremely high shear rate. The fluid during the pressing at 2000 bar achieves a speed up to 400 m/s and goes through a microchannel with diamond coating where the clusters are reduced to the desired size. A cold grinder is used to avoid temperature increase during the process due to the friction with the grinding media. Sodium Hydroxide is used to adjust the pH at 10 as the optimized solution against sedimentation. pH=10 is a chemical condition of the nanofluid that leads the zeta potential above 25 mV against sedimentation of the nanoparticles.

Using the fluidizer makes it possible to achieve pressure of 2000 bar and relevant shear rate. The fluidizer also increases the volume flow rate of the process with much higher feasibility compared to the sonication process. The cold grinding avoids degradation of the surfactant that is inside the chamber during the grinding. The high temperature resistant surfactant is more suitable to avoid degradation of the additive during the grinding process where high temperature friction occurs.

In some embodiments, the heat transfer mixture of the present disclosure includes nanoparticles that form clusters or agglomerates, i.e. particles made up from the union of many nanometric particles which have dimensions substantially greater than the single particles. It was previously believed that this phenomenon had a negative effect as it was believed that clusters only increased the likelihood of sedimentation. However, it has been found that when the clusters or agglomerates of nanoparticles within certain dimensions are combined with a surfactant additive, they can help to increase the effective thermal properties of the heat transfer mixture.

In some embodiments, the heat transfer mixture of the present disclosure provides a stable nanofluid, wherein the solid phase does not tend to be separated from the liquid phase, depositing on the bottom of the containers in which the nanofluid is stored or in the system's pipes where it is utilized.

In some embodiments, the solid phase of the heat transfer mixture of the present disclosure comprises aluminum oxide nanopowder. In some embodiments, the liquid phase of the heat transfer mixture of the present disclosure comprises water and surfactants. In particular, as explained in detail in the following, the characteristics which determine the heat exchange capacity and the stability of the nanofluid are the morphological, dimensional and structural characteristics of the solid component and the presence and concentration of chemical additives in the liquid phase. The factors to be worked on to stabilize the suspension with respect to the nanoparticles' aggregation are the suspension pH, the interface tension and the surface electrostatic charge of the nanoparticles.

Generally, a particle dispersed in a liquid, at the surface has electrostatic charges which determine an electric field responsible for the redistribution of the ions provided in the space surrounding the same particle. This leads to an increase in ion concentration of charge opposite to the one of the particles at the surface. In particular, the liquid layer surrounding the particle is made up of two zones: an inner one (Stern layer) with ions strongly linked to the particle, and an outer one (Gouy-Chapman layer or diffused layer), where the electrostatic interactions are weaker. The two zones constitute a double electric layer around each particle. Inside the diffused layer two zones can be defined, separated by a plane which is the shear plane. When the particle moves, the ions of the diffused layer closer to the particle than to the shear plane move with it while those beyond the shear plane are continually substituted by other ions present in the liquid.

This charge distribution determines an electric potential variable according to the distance of the particle, which is the zeta potential. When two particles are so close that their double layers overlap, these repel each other with an electrostatic force whose intensity depends on the zeta potential, and at the same time they attract each other by the known Van der Walls attraction. If the zeta potential is too low, the repelling force is not strong enough to exceed the Van der Walls force between the particles, and these begin to agglomerate thus making the suspension instable. A high zeta potential avoids agglomeration and maintains uniformity in the dispersion.

Another condition on which the suspension stability depends is the wettability status of the solid particles, i.e. the capacity of the liquid to be distributed on the surface of a solid, which depends on the surface tensions of the liquid phase and solid phase.

In fact, when a liquid and a solid come in contact, an interface tension results owing to the interactions between the phases. Assuming that a liquid drop is in contact with a solid surface, the profile of a liquid portion arranged on a solid surface forms a Θ angle, which is the wettability angle, which is greater or lesser than 90° depending on whether the cohesion forces prevail between the liquid molecules or whether the adherence forces prevail between the molecules of the two different solid and liquid phases. The Θ angle can be expressed by the following relation:

$$\cos(\Theta)=(yS-ySL)/yL \tag{1}$$

where yS, ySL and yL are respectively the surface tensions between the solid and the air, the solid and the liquid (interface tension) and the liquid and the air. From (1) it is noted how the wettability of the liquid can be increased by decreasing the surface tension of the liquid.

To obtain such a result inside the suspension, thus decreasing the aggregation tendency of the particles, we introduce substances that influence the liquid-solid surface tension (surfactants). Surfactants are a class of organic compounds comprising a hydrophilic portion (polar, presenting affinity with water and so soluble) and a hydrophobic portion (nonpolar, presenting affinity with oil substances and so insoluble in water). By adding a surfactant in the water-based suspension, the surfactant molecules arrange themselves on the separation surfaces between the liquid phase and the solid phase with the polar portion towards the liquid phase and the non-polar portion towards the solid phase (or aeriform in case of liquid-air separation surface).

In order to control the suspension stability, it is necessary to intervene on the electrostatic charge around the particles and on the interface tension between solid phase and liquid phase.

In some embodiments, the solid phase of the heterogeneous mixture comprises aluminum oxide nanoparticles with specific morphology and dimensions. In some embodiments, the solid phase dispersed in the liquid is made up of particles of nanometric dimensions (nanopowders or nanoparticles) with an average dimension between about 100 nanometers and about 600 nanometers. In some embodiments, the solid phase dispersed in the liquid is made up of particles of nanometric dimensions (nanopowders or nanoparticles) with an average dimension between about 200 nanometers and about 500 nanometers. In some embodiments, the solid phase dispersed in the liquid is made up of particles of nanometric dimensions (nanopowders or nanoparticles) with an average dimension between about 300 nanometers and about 400 nanometers. In some embodiments, the solid phase dispersed in the liquid is made up of particles of nanometric dimensions (nanopowders or nanoparticles) with an average dimension between about 400 nanometers and about 600 nanometers. In some embodiments, the solid phase dispersed in the liquid is made up of particles of nanometric dimensions (nanopowders or nanoparticles) with an average dimension between about 100 nanometers and about 600 nanometers. In some embodiments, the solid phase dispersed in the liquid is made up of particles of nanometric dimensions (nanopowders or nanoparticles) with an average dimension between about 300 nanometers and about 600 nanometers. In some embodiments, the solid phase dispersed in the liquid is made up of particles of nanometric dimensions (nanopowders or nanoparticles) with an average dimension between 100 nanometers and 600 nanometers. In some embodiments, the solid phase dispersed in the liquid is made up of particles of nanometric dimensions (nanopowders or nanoparticles) with an average dimension between 300 nanometers and 600 nanometers.

In some embodiments, the concentration of the nanopowders or nanoparticles is between about 0.1% by volume of the nanofluid and about 50% by volume of the nanofluid. In some embodiments, the concentration of the nanopowders or nanoparticles is between about 1.0% by volume of the nanofluid and about 40% by volume of the nanofluid. In some embodiments, the concentration of the nanopowders or nanoparticles is between about 2% by volume of the nanofluid and about 30% by volume of the nanofluid. In some embodiments, the concentration of the nanopowders or nanoparticles is between about 3% by volume of the nanofluid and about 30% by volume of the nanofluid. In some embodiments, the concentration of the nanopowders or nanoparticles is between about 4% by volume of the nanofluid and about 30% by volume of the nanofluid. In some embodiments, the concentration of the nanopowders or nanoparticles is between about 5% by volume of the nanofluid and about 30% by volume of the nanofluid. In some embodiments, the concentration of the nanopowders or nanoparticles is between about 6% by volume of the nanofluid and about 25% by volume of the nanofluid. In some embodiments, the concentration of the nanopowders or nanoparticles is between about 10% by volume of the nanofluid and about 20% by volume of the nanofluid. In some embodiments, the concentration of the nanopowders or nanoparticles is between 0.1% by volume of the nanofluid and 50% by volume of the nanofluid. In some embodiments, the concentration of the nanopowders or nanoparticles is between 1.0% by volume of the nanofluid and 40% by volume of the nanofluid. In some embodiments, the concentration of the nanopowders or nanoparticles is between 2% by volume of the nanofluid and 30% by volume of the nanofluid. In some embodiments, the concentration of the nanopowders or nanoparticles is between 3% by volume of the nanofluid and 30% by volume of the nanofluid. In some embodiments, the concentration of the nanopowders or nanoparticles is between 4% by volume of the nanofluid and 30% by volume of the nanofluid. In some embodiments, the concentration of the nanopowders or nanoparticles is between 5% by volume of the nanofluid and 30% by volume of the nanofluid. In some embodiments, the concentration of the nanopowders or nanoparticles is between 6% by volume of the nanofluid and 25% by volume of the nanofluid. In some embodiments, the concentration of the nanopowders or nanoparticles is between 10% by volume of the nanofluid and 20% by volume of the nanofluid.

In some embodiments, the heat transfer mixture of the present disclosure is a biphasic mixture made up of a liquid fraction and a solid fraction; the liquid fraction comprises water, propylene glycol or ethylene glycol, surfactant, pH corrector additives in such a concentration to maximize the zeta potential and to minimize the interface tension between solid phase and liquid phase, and anticorrosive agents.

In some embodiments, the mass ratio between the surfactant quantity present in the liquid phase and the quantity of nanopowders is between about 2% and about 4%. In some embodiments, the mass ratio between the surfactant quantity present in the liquid phase and the quantity of nanopowders is between about 2.5% and about 3.5%. In some embodiments, the mass ratio between the surfactant quantity present in the liquid phase and the quantity of nanopowders is about 3%. In some embodiments, the mass ratio between the surfactant quantity present in the liquid phase and the quantity of nanopowders is between 3.5%.

In some embodiments, the concentration of the surfactant is between about 0.1% by total volume of the nanofluid and about 3% by total volume of the nanofluid. In some embodiments, the concentration of the surfactant is between about 0.5% by total volume of the nanofluid and about 2.5% by total volume of the nanofluid. In some embodiments, the concentration of the surfactant is between about 1% by total volume of the nanofluid and about 2% by total volume of the nanofluid.

In some embodiments, the nanoparticles in the nanofluid have regular morphology, in particular spherical morphology allowing for optimizing the heat exchange capacity and reducing the tendency for the nanoparticles to be trapped on the surfaces of the pipes. In some embodiments, the nanoparticles in the nanofluid have an irregular morphology. In some embodiments, the nanoparticles in the nanofluid are in the form of clusters.

In some embodiments, the heat transfer mixture of the present disclosure has a density (at 20° C.) between 1 g/cm$^3$ and 1.65 g/cm$^3$. In some embodiments, the heat transfer mixture of the present disclosure has a dynamic viscosity (at 20° C.) between 1 cps and 30 cps. In some embodiments, the heat transfer mixture of the present disclosure at 2% nanoparticle concentration has thermal conductivity increment (at 20° C.) between 15% and 17% and the increment in terms of thermal conductivity is linear with the concentration in the heat transfer mixture.

In some embodiments, the nanofluid preparation comprises mixing water, the nanoparticles, the surfactant and propylene glycol or ethylene glycol; milling by means of rapid mill; and fluidization. In the mixing step, the tap water, the surfactant, propylene glycol or ethylene glycol and the powder comprising the nanoparticles are mixed in quantities such that the desired solid volume percentage is reached. The mixing is accomplished using a cold grinder that is kept at a low temperature to avoid any temperature increase due to the friction with the grinding media. The solution is milled based on continuous mill, which consists of a jug inside with zirconia grains. By using this method, the clusters of nanoparticles are not crushed. Grain diameter=0.3 mm-1 mm depending on the mixture concentration. After milling, the outlet nanofluid is collected in a continuous fluidizer. The fluidizer utilizes a mechanical process which subjects the nanofluid to an extremely high shear rate. During the process, the fluid achieves a speed up to 400 m/s through a microchannel with a diamond coating where the clusters are reduced to a selected size. In some embodiments, the nanofluid preparation does not involve sonication. In some embodiments, sodium hydroxide is used to adjust the pH of the nanofluid to 10.0.

In some embodiments, the liquid component of the heat transfer mixture of the present disclosure does not include any additives, such as, for example, a base additive, an acid additive, or a corrosive inhibitor. In some embodiments, the liquid component of the heat transfer mixture of the present disclosure includes a base as the only additive. In some embodiments, the liquid component of the heat transfer mixture of the present disclosure includes an acid as the only additive. In some embodiments, the liquid component of the heat transfer mixture of the present disclosure includes a corrosive inhibitor as the only additive. In some embodiments, the base additive comprises sodium hydroxide [NaOH], potassium hydroxide[KOH], calcium hydroxide [Ca(OH)$_2$] and is used to increase the pH of the product after the preparation process due to the fact that pH is 10 is the required basic level to warranty the stability of the nanoparticles in the suspension. In fact, the "zeta potential" related to the electrochemical field around the nanoparticle in the fluid is more pronounced when pH is higher than 8.5. In some embodiments, the acid additive comprises hydrochloric acid, acetic acid, and/or phosphoric acid and is used in the formulation of the nanofluid with ethylene glycol since in that case the pH is higher than 10 and the acid is necessary to reduce the pH to 10 for a stable nanofluid suspension. In some embodiments, the corrosive inhibitor comprises molybdate anion, calcium nitrite, zinc phosphate, chromates and/or lanthanide compounds and is used to avoid corrosion phenomena between the nanoparticles and the metal surface of the system where it is installed. The inhibitors are useful to avoid pitting phenomena resulting from the deposit and contact between nanoparticles and metal surfaces.

In some embodiments, the liquid component of the heat transfer mixture of the present disclosure includes one or more additives to provide other desired chemical and physical properties and characteristics. In some embodiments, the additives include a base additive, an acid additive and/or a corrosive inhibitor in addition to the components discussed above. That is, the heat transfer mixture of the present disclosure can include a base additive, an acid additive and/or a corrosive inhibitor in addition to water, the nanoparticles, the surfactant and propylene glycol and/or ethylene glycol. In some embodiments, the base additive, the acid additive and/or the corrosive inhibitor are combined with the nanoparticles, the surfactant and propylene glycol and/or ethylene glycol during the mixing step.

In some embodiments, the base additive is configured to increase the pH of the nanofluid. In some embodiments, the heat transfer mixture comprises propylene glycol and the surfactant produce a fluid having a pH below 7. As such, a base additive, such as, for example, sodium hydroxide is used to increase the pH up to 10. In some embodiments, the base additive includes KOH, NaOH, NaHCO$_3$, Ca(OH)$_2$, K$_2$CO$_3$, and/or Na$_2$CO$_3$. In some embodiments, the acid additive is configured to decrease the pH of the nanofluid. In some embodiments, the heat transfer mixture comprises ethylene glycol to produce a fluid with a pH that is higher than 10. The acid is therefore used to reduce the pH to 10 to reduce corrosion phenomena. In some embodiments, the acid additive includes hydrochloric acid, acetic acid and/or phosphoric acid. In some embodiments, the corrosive inhibitor is configured to prevent corrosion of the nanoparticles. In some embodiments, the corrosive inhibitor includes molybdate anion, calcium nitrite, zinc phosphate, chromates and/or lanthanide compounds and is used to avoid corrosion phenomena between the nanoparticles and the metal surface of the system where it is installed. The inhibitors are useful to avoid pitting phenomena resulting from the deposit and contact between nanoparticles and metal surfaces.

In some embodiments, the base additive includes triazoles, such as tolyl triazole and benzotriazole, aspartic acid, sebacic acid, borax, molybdates, such as molybdic oxide and sodium molybdate dihydrate, nitrites, amine-based compounds such as ethylene diamine, propylene diamine, morpholine, short aliphatic dicarboxylic acids such as maleic acid, succinic acid, and adipic acid, thiazoles such as mercaptobenzothiazole, thiadiazoles such as 2-mercapto-5-hydrocarbylthio-1,3,4-thiadiazoles, 2-mercapto-5-hydrocarbyldithio-1,3,4-thiadiazoles, 2,5-bis(hydrocarbylthio)-1,3,4-thiadiazoles, and 2,5-(bis)hydrocarbyldithio)-1,3,4-thiadiazoles, sulfonates, imidazolines or a combination of two or more thereof.

In some embodiments, the liquid component of the heat transfer mixture of the present disclosure does not include propylene glycol or ethylene glycol. In such embodiments, the liquid component of the heat transfer mixture of the present disclosure consists of water. In this embodiment, the heat transfer mixture represented by the formula: 1=Vw/Vnf+Vpw/Vnf+Vsf/Vnf+Vbs/Vnf+Vac/Vnf+Vci/Vnf, wherein Vnf is a volume of a nanofluid, wherein Vw is a volume of water, wherein Vpw is a volume of a nanopowder, wherein Vsf is a volume of a surfactant, wherein Vbs is a volume of a base additive, wherein Vac is a volume of an acid additive, and wherein Vci is a volume of a corrosive inhibitor. In one embodiment, the surfactant is HEDP/PBTC/PCA–etidronic acid/phosphonobutane-tricarboxylic acid/phosphino-carboxylic acid.

The heat transfer mixture of the present disclosure has a wide scope of uses including HVAC, power generation, chemical processing and data center cooling. With respect to HVAC the heat transfer mixture can be applied to various industrial and commercial HVAC systems and related components including chillers, heat exchangers, boilers and energy recovery units. In any hydronic heating and/or cooling system, the heat transfer mixture lowers heat exchanger approach temperatures, increasing heat transfer efficiency and reducing energy loss.

It will be understood that various modifications may be made to the embodiments disclosed herein. Therefore, the above description should not be construed as limiting, but merely as exemplification of the various embodiments. Those skilled in the art will envision other modifications within the scope and spirit of the claims appended hereto.

What is claimed is:

1. A heat transfer mixture comprising a nanofluid, the nanofluid consisting of propylene glycol, water, a nanopowder, a surfactant and a base additive, the heat transfer mixture being representative by the formula:

1=Vpg/Vnf+Vw/Vnf+Vpw/Vnf+Vsf/Vnf+Vbs/Vnf, wherein Vnf is a volume of the nanofluid,
wherein Vpg is a volume of the propylene glycol,
wherein Vw is a volume of the water,
wherein Vpw is a volume of the nanopowder,
wherein Vsf is a volume of the surfactant,
wherein Vbs is a volume of the base additive, and
wherein the nanopowder consists of aluminum oxide.

2. The heat transfer mixture recited in claim 1, wherein 5%<Vpg/Vnf<75%.

3. The heat transfer mixture recited in claim 1, wherein 5%<Vw/Vnf<94%.

4. The heat transfer mixture recited in claim 1, wherein 0.1%<VNP/Vnf<20%.

5. The heat transfer mixture recited in claim 1, wherein 0.01%<Vsf/Vnf<3%.

6. The heat transfer mixture recited in claim 1, wherein 0.1%<Vbs/Vnf<10%.

7. The heat transfer mixture recited in claim 1, wherein:
5%<Vpg/Vnf<75%;
5%<Vw/Vnf<94%;
0.1%<VNP/Vnf<20%;
0.01%<Vsf/Vnf<3%; and
0.1%<Vbs/Vnf<10%.

8. A heat transfer mixture consisting of:
propylene glycol;
water;
a nanopowder consisting of $Al_2O_3$;
a surfactant; and
a base additive,
wherein the nanopowder has a particle size between about 100 nanometers and about 600 nanometers,
wherein the heat transfer mixture comprises between about 1% by volume and about 20% by volume of the nanopowder,
wherein the heat transfer mixture comprises between about 0.010% by volume and about 3% by volume of the surfactant, and
wherein the heat transfer mixture has a pH is between about 8.5 to about 12.

9. The heat transfer mixture recited in claim 8, wherein the surfactant is a sodium salt solution of polyamino polyether methylene phosphonic acid.

10. The heat transfer mixture recited in claim 8, wherein the surfactant is represented by the formula:

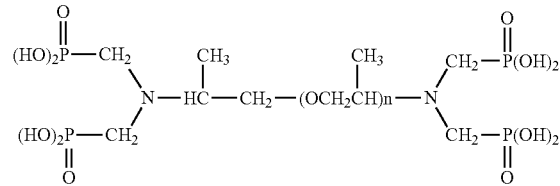

11. A heat transfer mixture consisting of:
between about 5% by volume and about 70% by volume of propylene glycol;
between about 5% by volume and about 94% by volume of water;
between about 1.0% by volume and about 20% by volume of a nanopowder consisting of $Al_2O_3$;
between about 0.01% by volume and about 3% by volume of a surfactant; and
between about 1.0% by volume and about 10% by volume of a base additive, wherein the nanopowder has a particle size between about 100 nanometers and about 600 nanometers, and
wherein the heat transfer mixture has a pH of about 10.0.

12. The heat transfer mixture recited in claim 11, wherein the surfactant is represented by the formula:

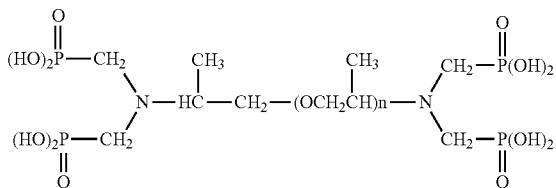

13. A heat transfer mixture comprising a nanofluid, the nanofluid consisting of ethylene glycol, water, a nanopowder, a surfactant, a base additive, an acid additive and a corrosive inhibitor, the heat transfer mixture being representative by the formula:

1=Veg/Vnf+Vw/Vnf+Vpw/Vnf+Vsf/Vnf+Vbs/Vnf+Vac/Vnf+Vci/Vnf, wherein Vnf is a volume of the nanofluid,
wherein Veg is a volume of the ethylene glycol,
wherein Vw is a volume of the water,
wherein Vpw is a volume of the nanopowder,
wherein Vsf is a volume of the surfactant,
wherein Vbs is a volume of the base additive,
wherein Vac is a volume of the acid additive,
wherein Vci is a volume of the corrosive inhibitor, and
wherein the nanopowder consists of aluminum oxide.

14. The heat transfer mixture recited in claim 13, wherein 30.0%<Veg/Vnf<50.0%.

15. The heat transfer mixture recited in claim 13, wherein 50.0%<Vw/Vnf<70.0%.

16. The heat transfer mixture recited in claim 13, wherein 1%<VNP/Vnf<3.0%.

17. The heat transfer mixture recited in claim 13, wherein 0.12%<Vsf/Vnf<0.40%.

18. The heat transfer mixture recited in claim 13, wherein 1.3%<Vbs/Vnf<2.0%.

19. The heat transfer mixture recited in claim 13, wherein 0.0<Vac/Vnf<2.0.

20. The heat transfer mixture recited in claim 13, wherein 0.012<Vci/Vnf<0.1.

21. The heat transfer mixture recited in claim 13, wherein:
30%<Veg/Vnf<50.0%;
50.0%<Vw/Vnf<70.0%;
1%<VNP/Vnf<3.0%;
0.12%<Vsf/Vnf<0.40%;
1.3%<Vbs/Vnf<2.0%;
0.0<Vac/Vnf<2.08; and
0.02<Vci/Vnf<0.1.

22. The heat transfer mixture recited in claim 13, wherein:
35.0%<Veg/Vnf<45.0%;
55.0%<Vw/Vnf<65.0%;
1%<VNP/Vnf<2.0%;
0.12%<Vsf/Vnf<0.40%;
1.3%<Vbs/Vnf<6.8%;
0<Vac/Vnf<2.0; and
0.02<Vci/Vnf<0.1.

23. The heat transfer mixture recited in claim 13, wherein the nanopowder is in a range between 100 nanometers and 600 nanometers.

24. The heat transfer mixture recited in claim 13, wherein the surfactant is a sodium salt solution of polyamino polyether methylene phosphonic acid.

25. The heat transfer mixture recited in claim 13, wherein the surfactant is represented by the formula:

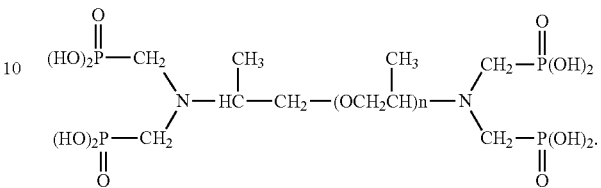

26. The Heat transfer mixture recited in claim 13, wherein the heat transfer mixture has a pH of between about 8.5-12.0.

27. The heat transfer mixture recited in claim 13, wherein the heat transfer mixture has a pH of 10.0.

28. A heat transfer mixture consisting of:
ethylene glycol;
water;
a nanopowder consisting of $Al_2O_3$;
a surfactant;
a base additive;
an acid additive; and
a corrosive inhibitor,
wherein the nanopowder has a particle size between about 100 nanometers and about 600 nanometers,
wherein the heat transfer mixture comprises between about 10% by volume and about 20% by volume of the nanopowder,
wherein the heat transfer mixture comprises between about 0.4% by volume and about 3% by volume of the surfactant, and
wherein the heat transfer mixture has a pH is between about 8.5 to about 12.0.

29. The heat transfer mixture recited in claim 28, wherein the surfactant is a sodium salt solution of polyamino-polyether-methylene-phosphonic acid.

30. The heat transfer mixture recited in claim 28, wherein the surfactant is represented by the formula:

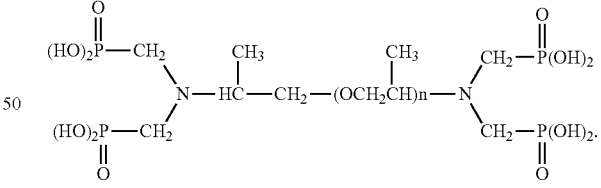

31. A heat transfer mixture consisting of:
between about 5% by volume and about 70% by volume of ethylene glycol;
between about 5% by volume and about 94% by volume of water;
between about 1.0% by volume and about 20% by volume of a nanopowder consisting of $Al_2O_3$;
between about 0.1% by volume and about 3% by volume of a surfactant;
between about 1.0% by volume and about 10% by volume of a base additive;
between about 0% by volume and about 6.8% by volume of an acid additive; and between about 0.12% by volume and about 0.10% by volume of a corrosive inhibitor,
wherein the nanopowder has a particle size between about 100 nanometers and about 600 nanometers, and
wherein the heat transfer mixture has a pH of about 10.0.

32. The heat transfer mixture recited in claim 31, wherein the surfactant is represented by the formula:

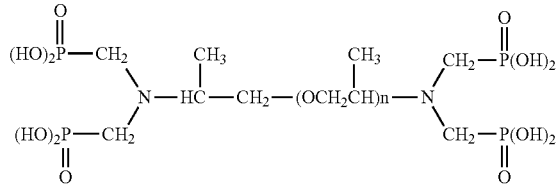

33. A heat transfer mixture comprising a nanofluid, the nanofluid consisting of ethylene glycol, water, a nanopowder, a surfactant and an acid additive, the heat transfer mixture being representative by the formula:

1=Veg/Vnf+Vw/Vnf+Vpw/Vnf+Vsf/Vnf+Vac/Vnf wherein Vnf is a volume of a nanofluid,
wherein Veg is a volume of ethylene glycol,
wherein Vw is a volume of water,
wherein Vpw is a volume of a nanopowder,
wherein Vsf is a volume of a surfactant,
wherein Vac is a volume of an acid additive, and
wherein the nanopowder consists of aluminum oxide.

34. The heat transfer mixture recited in claim 33, wherein 25%<Veg/Vnf<50%.

35. The heat transfer mixture recited in claim 33, wherein 30%<Vw/Vnf<70%.

36. The heat transfer mixture recited in claim 33, wherein 0.1%<VNP/Vnf<20%.

37. The heat transfer mixture recited in claim 33, wherein 0.01%<Vsf/Vnf<3%.

38. The heat transfer mixture recited in claim 33, wherein 0%<Vac/Vnf<10%.

39. The heat transfer mixture recited in claim 33, wherein:
25%<Veg/Vnf<50%;
30%<Vw/Vnf<70%;
0.1%<VNP/Vnf<30%;
0.01%<Vsf/Vnf<5%; and
0%<Vac/Vnf<10%.

40. A heat transfer mixture consisting of:
ethylene glycol;
water;
a nanopowder consisting of $Al_2O_3$;
a surfactant; and
an acid additive,
wherein the nanopowder has a particle size between about 100 nanometers and about 600 nanometers,
wherein the heat transfer mixture comprises between about 10% by volume and about 20% by volume of the nanopowder,
wherein the heat transfer mixture comprises between 0.1% about by volume and 3% by volume of the surfactant, and
wherein the heat transfer mixture has a pH of about 8.5 to about 12.0.

41. The heat transfer mixture recited in claim 40, wherein the surfactant is a sodium salt solution of polyamino polyether methylene phosphonic acid.

42. The heat transfer mixture recited in claim 40, wherein the surfactant is represented by the formula:

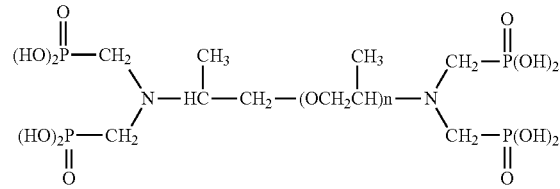

43. A heat transfer mixture consisting of:
between about 30% by volume and about 50% by volume of ethylene glycol;
between about 50% by volume and about 70% by volume of water;
between about 1.0% by volume and about 3.0% by volume of a nanopowder consisting of $Al_2O_3$;
between about 0.1% by volume and about 0.4% by volume of a surfactant; and
between about 0% by volume and about 2.0% by volume of an acid additive,
wherein the nanopowder has a particle size between about 100 nanometers and about 600 nanometers, and
wherein the heat transfer mixture has a pH of about 10.0.

44. The heat transfer mixture recited in claim 43, wherein the surfactant is represented by the formula:

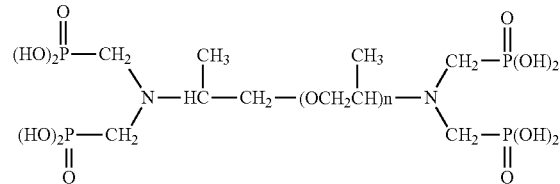

45. A heat transfer mixture comprising a nanofluid, the nanofluid consisting of water, a nanopowder, a surfactant, a base additive, an acid additive and a corrosive inhibitor, the heat transfer mixture being representative by the formula:

1=Vw/Vnf+Vpw/Vnf+Vsf/Vnf+Vbs/Vnf+Vac/Vnf+Vci/Vnf, wherein Vnf is a volume of a nanofluid,
wherein Vw is a volume of water,
wherein Vpw is a volume of a nanopowder,
wherein Vsf is a volume of a surfactant,
wherein Vbs is a volume of a base additive,
wherein Vac is a volume of an acid additive,
wherein Vci is a volume of a corrosive inhibitor, and
wherein the nanopowder consists of aluminum oxide.

* * * * *